Dec. 22, 1970     C. D. BOADLE     3,548,650

LOAD CELLS

Original Filed Feb. 13, 1967

Inventor
Campbell Dean Boadle
By
Attorneys

United States Patent Office

3,548,650
Patented Dec. 22, 1970

3,548,650
LOAD CELLS
Campbell Dean Boadle, Pentwyn Ponthir Road,
Caerleon, Monmouthshire, Wales
Continuation of application Ser. No. 615,720, Feb. 13,
1967. This application May 13, 1969, Ser. No. 826,074
Int. Cl. G01l 1/22, 1/26
U.S. Cl. 73—141                                3 Claims

ABSTRACT OF THE DISCLOSURE

A load cell comprising in a closed chamber a simply supported beam of constant cross-section, means whereby, on application of an external load to the cell, equal deflecting forces are applied to the beam at two points each spaced inwardly of the beam supports an equal amount and strain gauges located on the beam between the points at which the deflecting force is applied.

---

This application is a continuation of my prior U.S. application Ser. No. 615,720, filed Feb. 13, 1967, now abandoned.

DESCRIPTION OF INVENTION

This invention relates to transducers which are used for weight or force measurement, commonly called load cells.

Such transducers utilise, in their most precise forms, a spring member which is deformed by the load, and whose deformation is measured in selected places by electrical resistance strain gauges bonded to the spring. It is usual for four or more gauges to be utilised, connected in the form of a bridge network, two or more of the gauges registering the strain, or deformation of the spring. The other gauges may register only a low level of strain, strain of the opposite sign, or none at all, and are incorporated in the electrical measuring system for the purpose of rendering it insensitive to temperature.

The material and geometry of the spring and its loading devices are always carefully selected so that the strains produced in the material by the applied load are precisely proportional to the load, so that a load cell of high inherent linearity is produced, good linearity being an important feature of a load cell where the combined electrical output from several cells bearing a load is required. For cells of high load capacity, the spring commonly takes the form of a column of high strength steel axially loaded. For lower capacities, the column dimensions become too small to permit the attachment of practical strain gauges, and in these cases the column is replaced by other forms of spring, such as a proving ring, (i.e. a column incorporating a hoop member, in which the load is applied across a diameter of the hoop), a diaphragm, or some other geometrical form utilising bending stresses in a member with or without added direct stresses.

For very low capacity load cells, most of the devices which have been used so for are impracticable for load capacities of the order of 1 lb., as they become too small or too thin to permit the attachment of strain gauges, and still give a useful electrical signal level.

The invention aims to provide a low capacity load cell which will give a useful electrical signal level which is practicable for production in quantity without sacrificing the essential properties of small movement of the loading point, high linearity, a high standard of repeatability and a high sensitivity.

To this end, according to the invention the strain gauges of a load cell are located on a so called "four point load" beam of constant cross-section. That is to say, the gauges are located on a simply supported beam and means are provided whereby, on application of a load to the cell, equal deflecting loads are applied at two points each spaced inwardly of one of the supports whereby the beam between the loading points assumes circular curvature.

The strain experienced by the beam everywhere on its outer surface between the loading points is constant, and if therefore strain gauges are applied, four or more in number to these surfaces, with their active axes in the direction of stress in the beam there can be formed a bridge network in which pairs by gauges are in tension, and pairs are in compression. This arrangement gives double the normal sensitivity to the bridge against the usual arrangement where two of the gauges are unstrained. It has an additional advantage in that the resistance of the cell remains unchanged with load, which is an important advantage in high precision systems where several load cells share a load in intermediate proportions.

Further, because the strain in the centre segment of the beam is everywhere constant, the exact positioning of the strain gauges is not important, so that bridge balance and sensitivity are unaffected by errors in position of the gauges.

In column type cells, the principal source of non linearity arises from the small changes in cross section which occur under stress; in compression cells, the column becomes slightly wider as the load increases, and hence equal increments of load do not produce equal increments of stress, and hence of strain, at all points in the load range. A similar effect can be noted in bending beams: where the beam is narrow perpendicular to the plane of bending, it tends to broaden out on the compression face and to narrow on the tension face, and a non linearity of a similar type results.

By using a thin, broad beam in a cell according to the invention, this effect is greatly reduced. In the beams of the cell of the invention, as they are deflected in bending, as well as the normal direct bending stresses produced in the plane of bending, stresses at right angles to the plane of bending appear, tensile in the compression side and vice versa. These stresses vary across the width of the beam, disappearing at its edges, but near the centre plane of the beam are approximately constant, and have the effect of greatly improving the linearity of the load; bending strain relationship in the region which carries the strain gauges, and hence the linearity of the cell as a whole.

All load cells of the kind with which the invention is concerned depend on the maintenance of the values of electrical resistance between the electrical circuit and the frame of the load cell, and this is usually attained by hermetically sealing the case of the load cell, so that atmospheric moisture does not have access to the internal parts. In the conventional cell the head of the load cell column is usually connected to the case by means of a flexible diaphragm, so that no measurable restraint is applied to the column over its very small range of axial movement under load, while maintaining a hermetic seal. One result of this enclosure is that temperature changes which the cell may undergo produce corresponding gas pressure changes inside the cell from the column of gas trapped there. The resulting changes in pressure force on the diaphragm can cause a shift in the output signal with temperature, akin to a zero shift in its nature.

For large capacity load cells, this effect, for normal temperature changes, is about 0.1% of the cell capacity, and it is easily balanced out electrically. For small capacity cells, however, with the same size of body as a larger cell, the magnitude of this pressure force change is the same, and may be several times the capacity of the cell; in which case it is not possible to balance out these changes electrically.

The invention also aims to overcome this difficulty and to this end according to the invention means are provided within the cell for isolating the chamber from the effects of changes in internal air pressures.

One way of achieving this is to employ a pair of diaphragms, one at each end of the cell body but coupled together so that changes in air pressure react equally and oppositely on each diaphragm whereby there is only a very small difference in pressure load remaining from small inequalities. Such small inequalities that remain can, of course, be readily balanced out electrically.

An alternative method of isolating from the effects of change of internal pressure is to employ one diaphragm and provide means for venting the body of the cell through a dust barrier and moisture diffuser.

The invention will be further described by way of example with reference to the accompanying drawings, in which.

Figure 1:
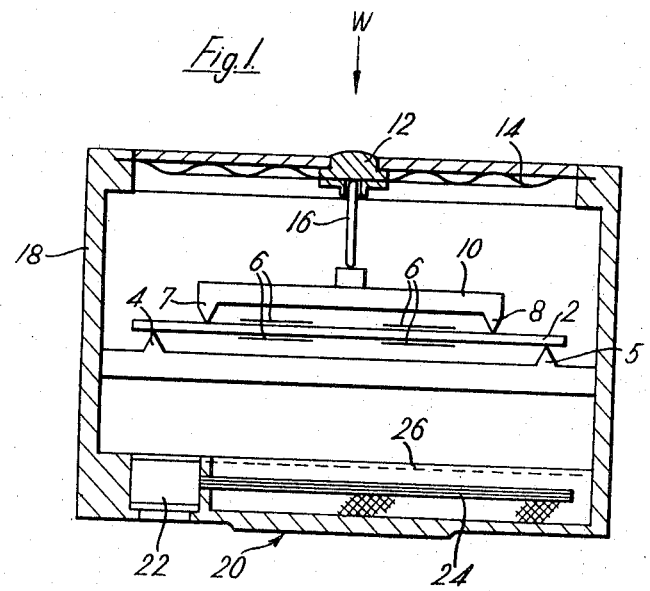
FIG. 1 is a section through a load cell according to the invention.

Referring to FIG. 1, a primary spring is provided by a thin beam 2 of heat treated material such as high tensile steel or other alloy, which is supported near its ends of two hinged (i.e. frictionless) supports 4, 5. The beams carry strain gauges 6. The load is applied to the beam 2 symmetrically through two other hinged (i.e. frictionless) supports 7, 8, which connect the beam at two points to a bridge piece 10, in the centre of which the load W is applied. By this means the load is divided equally between the ends of the beam 2, and because of the geometrical symmetry of the system, a constant bending moment is applied to the beam between the two load hinges whereby that segment in the centre of the beam takes up a uniform curvature under load (i.e. it assumes a circular curvature).

The load is applied to the bridge piece 10 through a load button 12 carried on a thin metal diaphragm 14, which may for example be of an aluminium alloy. A short column 16, pin ended or resting on spherical support points is provided between the bridge piece 10 and the load button. By this means any small sideways deflection of the button merely causes the column to rock slightly, producing a negligible side effect on the beam system. Thus the beam is isolated from any external side forces. Preferably also the point of contact between the column and the load button should lie in the plane of the diaphragm, so that any rocking of the load button due to external influence will cause negligible movement sideways of the top of the column.

The body 18 of the cell is vented through the system 20. The atmosphere has access, first through a very fine pore size filter 22, such as sintered glass or metal disc filter, which acts as a barrier to dust and a diffusion barrier to moisture; then through a long small bore metal tube 24, of a length: diameter ratio greater than 100, which acts as a further diffusion barrier, and finally through a drying agent such as silica gel, activated alumina, or molecular sieve material, exposed to the interior of the cell by means of a metal gauze window 26.

The vent system is so designed that the flow of air through it induced by temperature of load changes on the cell produce a pressure difference to atmosphere so small as to be hardly measurable; while at the same time providing a dust filter and a diffusion barrier to the ingress of moisture which is completely effective. It is quite practicable to provide sufficient drying agent to cater for the likely ingress of moisture for at least five year operation, and the rate of movement to the electrical system thereafter would be so slow that for all practical purposes it is nonexistent.

The vent filter, which is directly exposed to the atmosphere is preferably housed in a protected position, such as the base of the cell, where dust cannot directly fall on to it out of the atmosphere.

Figure 2:
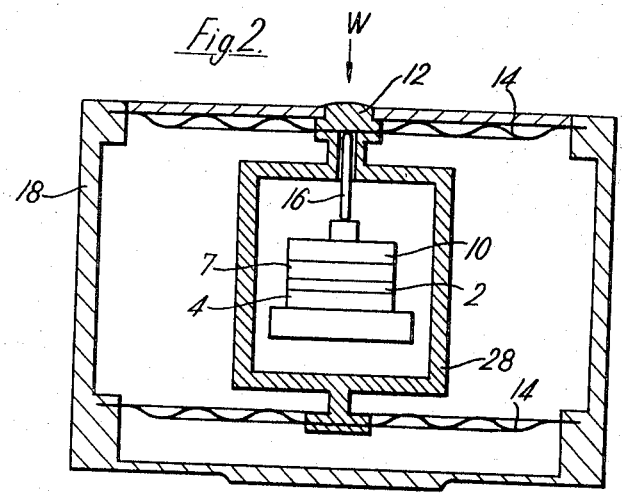
FIG. 2 is a section through a modified form of load cell according to the invention, the section being at right angles to the section shown in FIG. 1, that is to say, at right angles to the length of the beam.

In the alternative structure shown in FIG. 2 a pair of diaphragms 14 may be used, one at each end of the cell body. The diaphragms are coupled together by means of a stirrup 28 which passes round a beam structure which is the same as that described with reference to FIG. 1. By this means changes in air pressure react equally and oppositely on each diaphragm, and the very small difference in pressure load remaining from small inequalities can be balanced out easily electrically.

For very low capacity cells, however, the use of a pair of diaphragms may divert an unacceptable proportion of the load from the beam due to the spring properties of the diaphragms. Any change in diaphragm properties with time would then be reflected in an unduly large change in load cell characteristics. For this reason in very low capacity cells it is preferred to use the construction of FIG. 1.

The load cells of the invention have been proved useful with loads up to 10 pounds but it is believed that they may be usefully employed with loads up to 50 pounds or above.

I claim:
1. A load cell comprising a chamber having side walls and end walls; a broad thin beam contained within the chamber and simply supported therein on beam supports; a bridge member contacting the beam at two points equally spaced inwardly of the beam supports; a load applying member projecting through one end wall and by means of which a load can be applied to the bridge member whereby the force applied at each of its contact points on the beam is equal, so that the beam assumes a circular curvature when loaded through the bridge; pairs of resistance strain gauges located on each side of the beam with their active axes along the center of width of the beam; and venting means for the chamber including a dust barrier and moisture diffuser, whereby the air pressure inside and outside the chamber is equalized.

2. A load cell according to claim 1 in which the load is applied through said load applying member located in an airtight manner in a diaphragm in the chamber, which load applying member projects through the said end wall of the chamber, the diaphragm being attached in an airtight manner to said side walls and said load applying member.

3. A load cell according to claim 1 in which the dust barrier and moisture diffuser are in the form of a sintered metal and glass filter and a diffuser in the form of a small bore tube having a length to bore ratio of at least 100, through both of which air must pass in entering or leaving the chamber.

References Cited

FOREIGN PATENTS

| 2,319,299 | 5/1943 | Converse. |
| 2,670,195 | 2/1954 | Baker. |
| 2,899,191 | 8/1959 | Hunt. |
| 3,272,006 | 9/1966 | Eckard. |
| 3,303,695 | 2/1967 | Laimins et al. |
| 3,320,802 | 5/1967 | Birkholtz. |

FOREIGN PATENTS

| 988,667 | 5/1951 | France. |

CHARLES A. RUEHL, Primary Examiner

U.S. Cl. X.R.

177—211